Nov. 2, 1954    A. B. BELGARD    2,693,132
TEMPLE AND HINGE STRUCTURE AND METHOD OF FORMING
Filed March 28, 1952
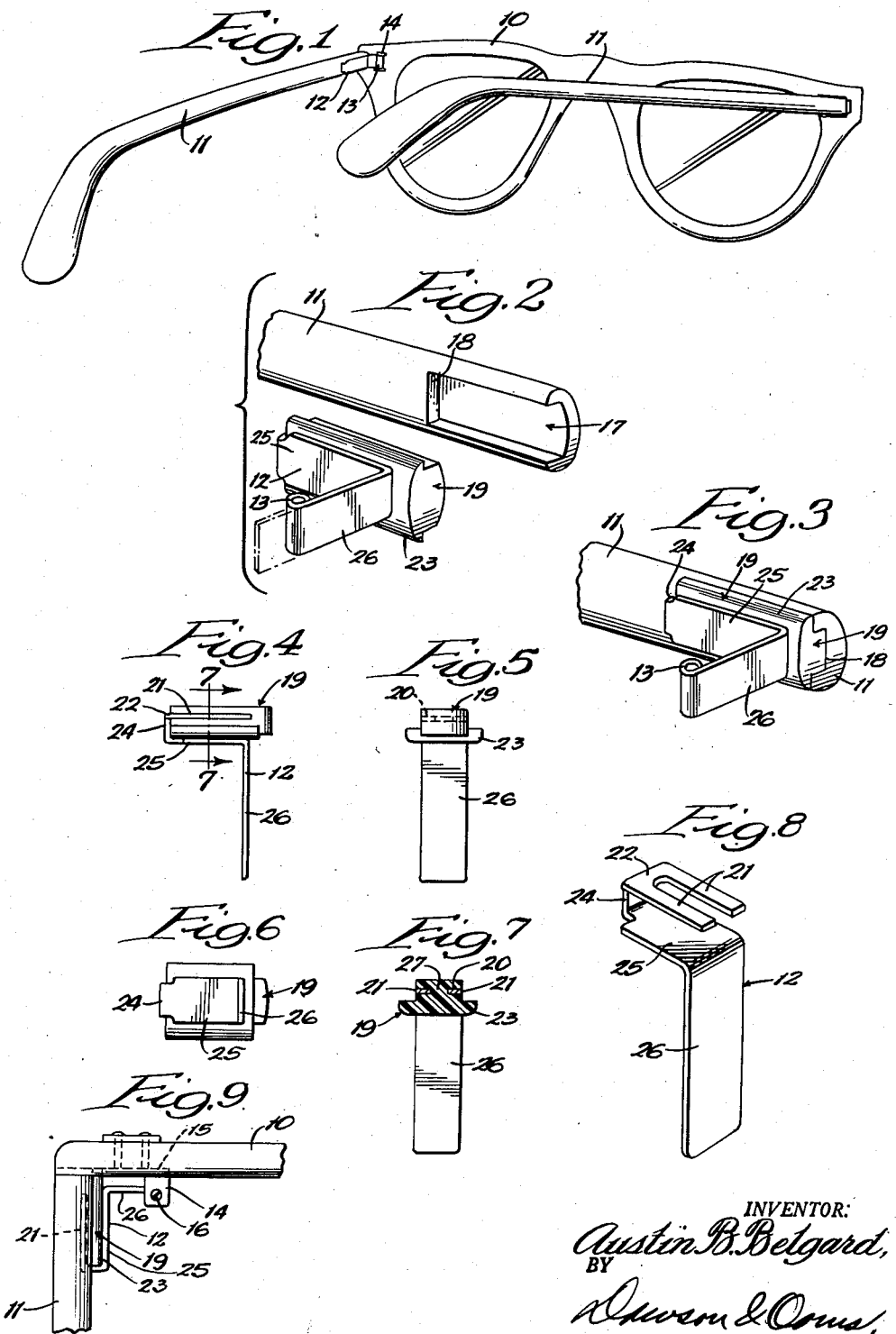
INVENTOR:
Austin B. Belgard,
BY
Dawson & Ooms,
ATTORNEYS.

United States Patent Office

2,693,132
Patented Nov. 2, 1954

2,693,132

TEMPLE AND HINGE STRUCTURE AND METHOD OF FORMING

Austin B. Belgard, Evanston, Ill.

Application March 28, 1952, Serial No. 278,998

8 Claims. (Cl. 88—53)

This invention relates to a temple and hinge structure and method of forming the same. More particularly, the invention relates to temples of eyeglasses or spectacles in which the temples are united to the eyeglass front by hinge means united to the temple in a unique manner.

In the eyeglass field, one difficult problem has had to do with the fitting of temples to eyeglass fronts for the fitting of wearers because of the wide variation in the sizes and lengths of temples required. The expense of eyeglasses has been greatly increased because the optician is required to stock an excessive amount of temples with eyeglass fronts, much of the stock becoming obsolete before being placed in use. There has long been a need for simple and inexpensive means whereby temples can be adjusted readily to fit eyeglass fronts at a minimum of expense, while at the same time enabling eyeglasses to be thus readily adjusted for the accurate fitting of wearers even though the heads of the wearers vary widely in size and configuration, etc.

An object of the present invention is to provide a structure and a method by which the above desired results can be achieved and achieved quickly and with a minimum of expense. A further object is to provide a structure and a method by which temples of different stock lengths may be utilized readily in the forming of an eyeglass frame to fit accurately the face of the wearer. A still further object is to provide a method for assembling a metal hinge element with a temple through the use of extremely simple steps, while providing an integrated sturdy structure having important new advantages. Other specific objects and advantages will appear as the specification proceeds.

The invention is shown in an illustrative embodiment by the accompanying drawing, in which—

Figure 1 is a perspective view of an eyeglass frame showing the invention; Fig. 2, a broken perspective view of the temple and hinge connecting elements employed in my invention; Fig. 3, a broken perspective view of the temple equipped with the hinge element; Fig. 4, a side view in elevation of the hinge element and connecting plug; Fig. 5, a front view in elevation of the structure shown in Fig. 4; Fig. 6, a top plan view of the structure shown in Fig. 4; Fig. 7, a transverse sectional view, the section being taken as indicated at line 7—7 of Fig. 4; Fig. 8, a perspective view of the metal hinge leaf or element; and Fig. 9, a broken side view in elevation of the temple supported by a hinge upon the eyeglass front.

In the illustration given, 10 designates an eyeglass front and 11 designates a temple. The numeral 12 designates a hinge element which may have the free end thereof rolled into a cylindrical hinge member 13 adapted to receive the hinge pin. In the specific illustration given, the cylindrical member 13 is supported between spaced flanges 14 mounted upon a plate 15 secured to the eyeglass front 10, and a screw pin 16 extends through the flanges 14 and the hinge tube 13 to complete the hinge connection between members 12 and 15.

In one embodiment of my invention, I select a temple 11 of a desired shape and cut the front part of the temple to make it of the desired length. At the severed end of the temple I then cut a slot, indicated by the numeral 17, and as shown more clearly in Fig. 2. The slot 17 is open at the forward end and at its rear is closed by a substantially straight wall 18. The temple is preferably formed of plastic material such as is commonly used in the manufacture of eyeglass frames, as, for example, cellulose nitrate, acrylic resin plastic, etc.

I next provide a plug 19 formed of plastic which is preferably the same as the plastic employed for the temple 10, or at least a plastic which will fuse therewith upon the application of a suitable solvent or heat, etc. The plug 19 is provided with an intermediate slot 20 which extends from the rear of the plug toward the forward end thereof. In the specific illustration given, the slot is bifurcated as it approaches the front of the plug so as to receive the metal fingers 21 of the anchor plate 22 of hinge element 12. The outer surface of the plug is preferably provided with a flanged top 23 adapted to rest upon the inner side wall of the temple 11. The hinge element 12 has a vertical portion 24 extending along the rear side of the plug 19 and then a horizontal portion 25 extending forwardly over the outer flange 23. A laterally-extending portion 26 extends to one side and the end of the portion is rolled to form the barrel 13 for the hinge.

Operation

In the operation of the specific form of the invention illustrated, the temple 11, when cut to the desired length, is recessed to form the slot 17. Into the slot 17 is placed the plug 19, the lower portion of the plug fitting into the slot and the flange portion 23 abutting the inner side walls of the temple and extending along the edge walls of the temple to form an even continuation of the edge walls, as illustrated in Fig. 3. The plug, which has the slot receiving the fingers 21 of the hinge element 12, thus secures the hinge element within the slot 17 and the plug becomes integrated with the temple 11 by fusing the plug portions contacting the temple 11 by means of solvent, heat, or other means. The operation is accomplished very quickly, as, for example, by dipping the end of the temple with the plug assembled therein, as shown in Fig. 3, in a liquid solvent. For example, if the temple 11 and the plug 19 are formed of cellulose nitrate, an effective fusion is brought about by dipping the assembled end portion of the temple in acetone. Similarly, if an acrylic resin plastic is used, the temple may be dipped into ethyl dichloride. It will be understood that fusion may be effected by any suitable method or means.

The fusion of the plug with the temple body results in locking the metal shoe or retainer plate 21 firmly within the plug and the rear wall 24 of the hinge element is held against the straight wall 18 of the temple. Great rigidity of the joint is brought about by the interlocking of the hinge element with the plastic plug. For example, between the fingers 21 of the retainer plate 22 extends a rib 27 provided between the slots 20 of the plug 19, and the plate 22 is thus held against lateral movement. Further, the fused side walls of the plug with the side walls of the temple 11 enclosing slot 17 bring about a tight enclosure of the hinge plate fingers or prongs 21.

In the specific illustration given, the temple 11 is supported with its forward free end 28 abutting the glasses front 10, the hinge element 12 extending laterally from the temple and engaging the hinge flanges 14. This form of butt articulation between the temple 11 and spectacle front 10 is merely one form of structure in which the invention may be used. Instead of a butt articulation, the temple 11 may have its forward end inclined along an angle of 45° and abut the spectacle front along an angle of 45° formed in the front, as indicated in greater detail in my co-pending application, Serial No. 271,812. The present invention is not limited to this special type of hinge herein shown, but is adaptable for use with conventional hinges provided with a plate for imbedding within the plug received within the temple. Customers having old types of temple hinges are thus able to employ the old hinges with the plastic underlay or plug herein described, plastic being employed for the plug which matches the temple employed.

Under the method of the present application, the finished or assembled plug and hinge element, after fusion, present an integrated appearance in which the hinge element appears to be imbedded in the temple itself and the hinge element is held just as firmly or securely as if such imbedding were done in the original fabrication of the temple. Not only is the optician able to successfully carry on the fitting of eyeglasses to customers with a minimum stock of temples, but also is able to use old temples with new frames, quickly adjust any selected temple adapted to the wearer to make it of the desired length, and readily fit it to the selected eyeglass front. The entire operation is brought about in a few minutes of time, and in the resulting structure, the anchor portion of the hinge element is not exposed at any point but is completely covered within the integrated plastic plug and temple body.

While in the foregoing specification I have set forth a specific structure and specific steps in considerable detail, it will be understood that such details of structure and method may be varied widely by those skilled in the art without departing from the spirit of my invention.

I claim:

1. In an eyeglass frame, a plastic temple adapted to be connected adjacent its forward end to an eyeglass frame front and having a forward end portion thereof provided with a longitudinal slot, a plastic plug having a slot therein, and a metal hinge element received within the slot of said plug and being substantially embedded therein and having an attachment portion extending therefrom, said plug being received within the slot of said temple and fused therewith.

2. A temple and hinge element, comprising a plastic temple adapted to be connected adjacent its forward end to an eyeglass frame front and having a forward end thereof provided with a longitudinal slot, a plastic plug adapted to be received within said slot and having at the rear thereof a forwardly-extending slot, and a hinge element having a forwardly-extending anchor plate engaging the slot of said plug and being substantially embedded therein, said hinge element having an outwardly-extending portion equipped at its end with a hinge fitting, said plug being received within the slot of said temple and fused therewith.

3. The structure of claim 2, in which the slot within the plug has spaced-apart portions and in which the anchor plate has spaced fingers engaging said spaced slot portions.

4. A temple and hinge structure, comprising a temple having a slot formed therein at its inner side and adjacent its forward end, a plug having a body portion receivable within said slot, said plug having a slot extending therein along a median line, and a hinge element having an anchor plate received within the slot of said plug, said plug being received within said slot and integrated with said temple.

5. A temple and hinge structure, comprising a plastic temple having a longitudinal slot at its inner wall and adjacent its forward end, a plug having an outer flange resting upon the inner wall of said temple and having a reduced body portion received within said slot of said temple, said plug having a slot extending forwardly from the rear side thereof, and a hinge element having a portion extending about the rear edge of said plug and forwardly within said slot and substantially enclosed thereby, said plug being fused with said temple.

6. In a method for assembling a metal hinge element with the forward end of a temple, the steps of slotting the forward end of the temple on the inner wall thereof, forming a plug to fit said slot, forming a recess in the central portion of said plug, inserting an anchor portion of a hinge element within said recess, inserting said plug within said slot, and fusing the plastic plug with the plastic temple.

7. In a method for assembling a metal hinge element with a plastic temple, the steps of forming a slot in the forward end portion of the temple, forming a plastic plug to fit said slot, forming a recess in said plug, inserting an anchor plate portion of a hinge element within said recess, and dipping the end of said temple into a liquid solvent for the temple and plug to cause said plug and temple to fuse.

8. In a method for assembling a plastic temple with a metal hinge element having a bifurcated anchor plate, the steps of forming a slot at the forward end portion of the temple in the inner side wall thereof, slotting a plastic plug adapted to be received within said temple slot from the rear end of said plug forwardly, said slot having spaced portions for receiving the bifurcations of said anchor plate, inserting said anchor plate forwardly through said slot so that the anchor plate is substantially embedded therein, and applying to the assembled plastic plug and temple a solvent to fuse the temple to the plug.

References Cited in the file of this patent

UNITED STATES PATENTS

| Number | Name | Date |
|---|---|---|
| 1,649,796 | Stevens | Nov. 15, 1927 |
| 2,270,338 | Person | Jan. 20, 1942 |
| 2,300,834 | Spooner | Nov. 3, 1942 |